(12) United States Patent
Lee

(10) Patent No.: US 7,110,250 B2
(45) Date of Patent: Sep. 19, 2006

(54) HARD DISK SUPPORT APPARATUS AND COMPUTER HAVING THE SAME

(75) Inventor: Chung-youl Lee, Seongnam (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/883,974

(22) Filed: Jul. 6, 2004

(65) Prior Publication Data
US 2005/0030710 A1    Feb. 10, 2005

(30) Foreign Application Priority Data
Jul. 4, 2003    (KR)    ............ 10-2003-0045443

(51) Int. Cl.
*H05K 5/00*    (2006.01)
(52) U.S. Cl. .............. 361/685; 361/609; 312/332.1; 248/682
(58) Field of Classification Search .......... 361/609, 361/699–700, 679–687, 724–727; 312/223.2, 312/332.1, 333, 348.6; 211/95–96; 248/682
See application file for complete search history.

(56) References Cited

U.S. PATENT DOCUMENTS 5,557,499 A * 9/1996 Reiter et al. ............ 361/685
5,741,055 A    4/1998 Chen .................... 312/348.6
5,947,572 A * 9/1999 Chang .................... 312/332.1
6,325,353 B1 * 12/2001 Jiang .......................... 361/685
6,483,107 B1 * 11/2002 Rabinovitz et al. ......... 250/239
6,515,855 B1 * 2/2003 Removedummy .......... 361/685

FOREIGN PATENT DOCUMENTS

| JP | 8-55455 | 2/1996 |
| KR | 1998-34614 | 9/1998 |
| KR | 1999-9542 | 3/1999 |

OTHER PUBLICATIONS

Office action issued by the KIPO on Feb. 14, 2005.

* cited by examiner

*Primary Examiner*—Hung Van Duong
(74) *Attorney, Agent, or Firm*—Staas & Halsey LLP

(57) ABSTRACT

A hard disk support apparatus having a casing having an opening accommodate the hard disk; a main support body combined with the hard disk and accommodated in the opening; a lever provided in front of the main support body, having a first side rotatably combined to the main support body and a second side provided to be combined with the main support body; a control button provided either in the lever or in the main support body and releasing the second side of the lever from the main support body; and wherein the lever has a latch provided in an end side thereof, combined to or released from the opening by a rotation of the lever. With this configuration, the present invention provides a hard disk supporting apparatus readily installed and separated, and a computer having the same.

26 Claims, 8 Drawing Sheets

HARD DISK SUPPORT APPARATUS AND COMPUTER HAVING THE SAME

CROSS-REFERENCE TO RELATED APPLICATIONS

This application claims the benefit of Korean Patent Application No. 2003-45443, filed Jul. 4, 2003, in the Korean Intellectual Property Office, the disclosure of which is incorporated herein by reference.

BACKGROUND OF THE INVENTION

1. Field of the Invention

The present invention relates to a hard disk supporting apparatus and a computer having the same, and more specifically, to a hard disk supporting apparatus with an improved support structure and a computer having the same.

2. Description of the Related Art

In general, a hard disk is employed as a recording medium. Hard disks are usually installed in electronic apparatuses such as computers. The recent trend in hard disk technology is towards minimization of size, coupled with increased storage capacity. As such modern hard disks are becoming much smaller than their predecessors, server design is particularly effected by these recent changes. Specifically, server computers, which require a plurality of hard disks to be installed, are being redesigned to accommodate the changing size of hard disks. As such, various studies have been undertaken to determine the appropriate size for the server computer main bodies, and for a way to easily install the hard disks.

As shown in FIG. 1, a conventional server computer comprises: a computer main body 150, a casing 107 provided in the computer main body 150, having a plurality of opening parts 109, a support bracket 110 combined with a hard disk 105 and inserted into the opening part 109 to form a single body, a support part 120 protruded from each end of the support bracket 110 along its length direction, the support part having penetrating holes 121. At opposite sides of the opening part 109 in the casing 107 screw holes 108, screwed by screws 123, penetrating the penetrating holes 121 are provided.

A process of hard disk installation in conventional server computers follows.

Initially, the support bracket 110 is combined with the hard disk 105 and inserted into the opening 109 of the casing 107. Then, the support parts 120 contact opposite front sides of the opening 109 and the screw holes 108 are aligned with the penetrating holes 121 of the supporting parts 120. The support bracket 110 is then screwed to the casing 107 using the screws 123, thereby installing the hard disk 105 in the computer main body 150.

However, such installation methods in conventional server computers require screwing to install a hard disk in a computer main body, and thus it is an inconvenient and time consuming process.

SUMMARY OF THE INVENTION

Accordingly, it is an aspect of the present invention to provide a hard disk support apparatus which can be readily installed and separated, and a computer having the same.

Additional aspects and advantages of the invention will be set forth in part in the description which follows and, in part, will be obvious from the description, or may be learned by practice of the invention.

The foregoing and/or other aspects of the present invention are achieved by providing a hard disk support apparatus comprising: a casing having an opening to accommodate a hard disk; a main support body combined with the hard disk and accommodated in the opening; a lever provided in the front of the main support body, having a first side rotatably combined to the main support body and a second side provided to be combined with the main support body; a control button provided either in the lever or in the main support body to release the second side of the lever from the main support body; and wherein the lever has a latch provided in an end side thereof, combined to or released from the opening by a rotation of the lever.

According to an aspect of the present invention, the latch comprises a first tab and a second tab, both of which protrude from the first side of the lever having a predetermined distance therebetween so as contact with a back side and a front side of the opening, respectively.

According to an aspect of the present invention, the first tab secures the main support body in the casing by contacting the back side of the opening when the lever is rotated towards the main support body, and the second tab separates the main support body from the casing by contacting the front side of the opening when the lever is rotated away from the main support body.

According to an aspect of the present invention, the first side of the lever is rotatably combined with the main support body by a hinge shaft.

According to an aspect of the present invention, the second side of the lever is combined with the main support body using a combiner provided in the second side of the lever along a direction transverse to the direction of rotation; and a lock provided in the main support body to release the lever from the main support body when the control button is pressed.

According to an aspect of the present invention, the combiner further comprises an elastic member provided in the main support body to enable the lock and the control button to be elastically returned to a starting position after being pressed.

According to an aspect of the present invention, the hard disk support apparatus further comprises a spring provided between the main support body and the lever to enable the second side of the lever to elastically rotate toward the outside of the main support body According to an aspect of the present invention, the lock, the control button, and the elastic member are formed in a single body by injection molding.

According to an aspect of the present invention, a computer comprises the hard disk support apparatus and the computer main body to which the hard disk support apparatus is installed.

According to an aspect of the present invention, the casing includes a plurality of the openings, main support bodies, and levers. Each of the main support bodies and the levers are to be respectively combined with each of the openings.

According to an aspect of the present invention, the hard disk is of the 2.5 inch type.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
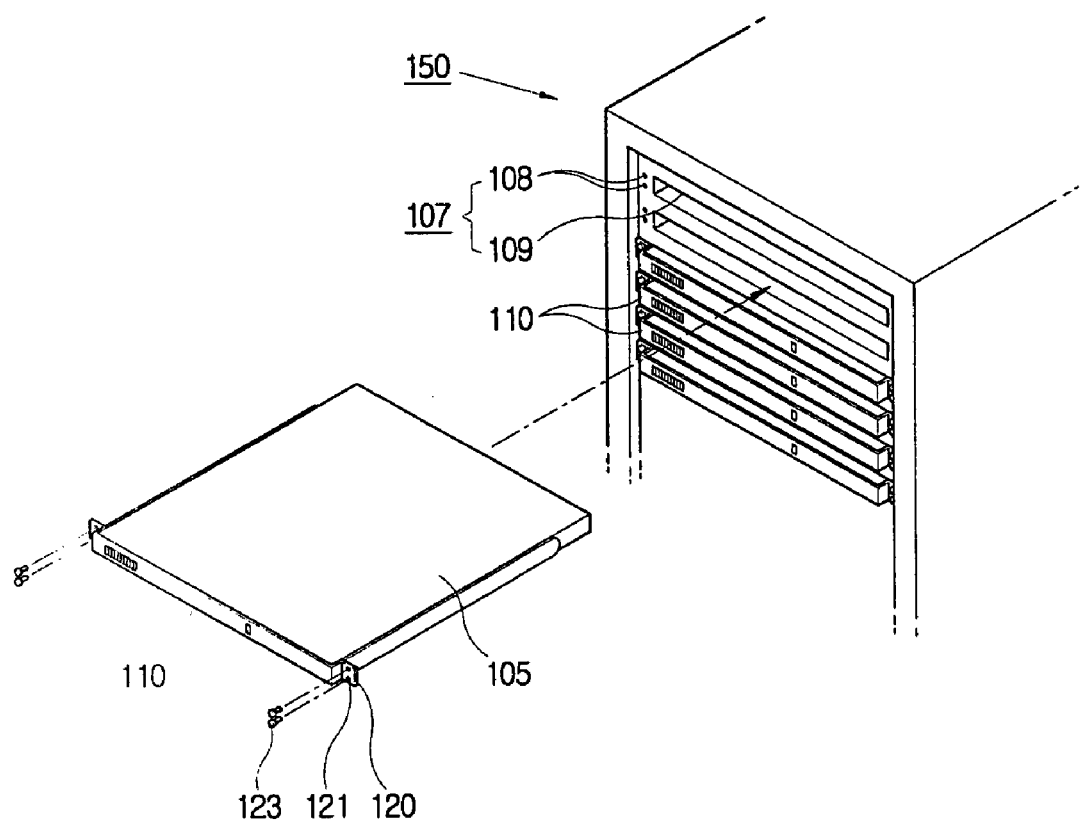
FIG. 1 is a schematic perspective view of a conventional server computer with a hard disk.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
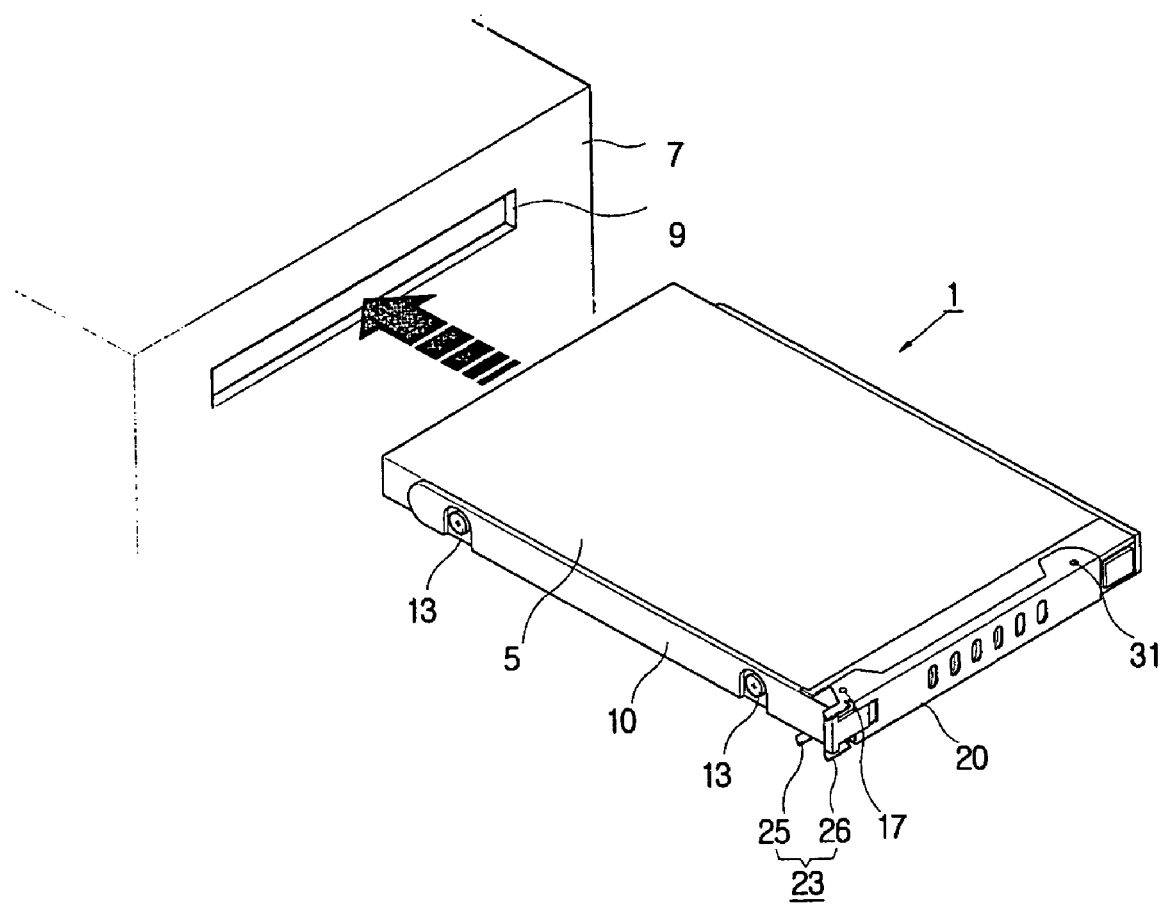
FIG. 2 is a schematic perspective view of a hard disk support apparatus according to an embodiment of the present invention.
Figure 3:
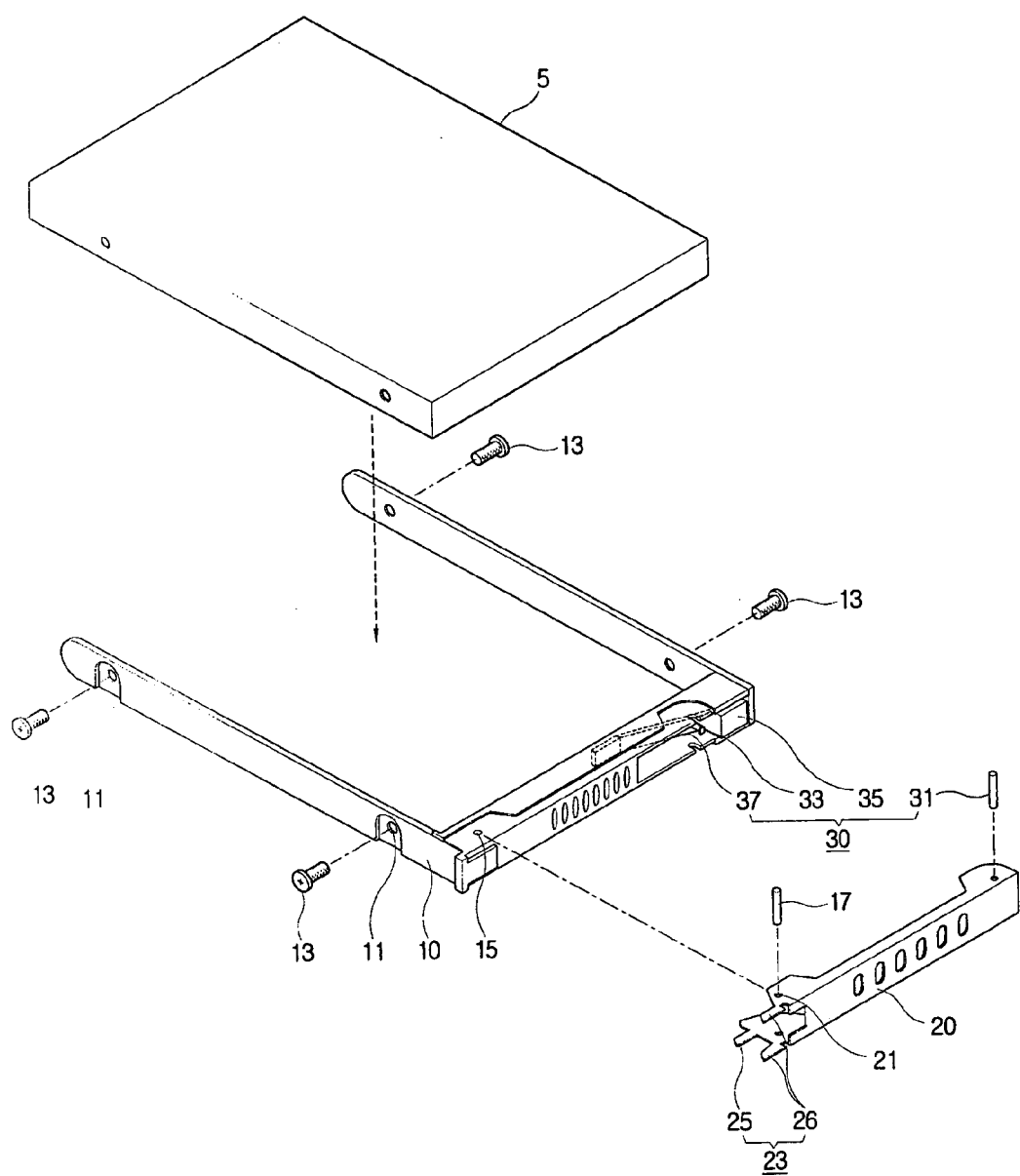
FIG. 3 is an exploded perspective view of the hard disk support apparatus in FIG. 2.

As shown in FIG. 2 and FIG. 3, a hard disk support apparatus 1 according to an embodiment of the present invention comprises a casing 7 combined with a hard disk 5 having an opening 9; a main support body 10 accommodated in the opening 9 to form a single body; a lever 20 having a first end rotatably combined to the main support body 10 and a second end combinable with the main support body 10; and a control button 35 provide either on the lever 20 or the main support body 10 to release the second end side of the lever 20 from the main support body 10.

The casing 7 is designed to accommodate and support the hard disk 5. The opening 9 is provided in a front side of the casing 7 to enable the hard disk 5 to be installed and separated. The casing can be a box type structure. In a rear side of the casing 7, a data connector (not shown) and a power connector (not shown) can be provided to be respectively connected with a data port (not shown) and a power port (not shown which are provided in a rear side of the hard disk 5.

The opening 9 is formed to accommodate the hard disk 5 and the main support body 10 therein. The opening 9 is sized to accommodate a first tab (to be described later) and a second tab (to be described later). A plurality of openings 9 may be provided to accommodate a plurality of hard disks 5 therein.

In an aspect of the present invention, the main support body 10 is formed in the shape of a "U" to be combinable with the front and the lateral sides of the hard disk 5. The main support body 10 has a screw hole 11, thru which a screw 13 is screw-coupled with the side of the hard disk 5.

The lever 20 is provided in a front side of the main support body 10 along a lengthwise direction. A side of the lever 20 is rotatably combined to the main support body 10 by a hinge shaft 17. The first side of the lever 20, being rotatably combined to the main support body 10, has a latch 23 that is engaged or released by a rotation of the lever 20. The second side of the lever 20 is combined to the main support body 10 by a combiner 30.

The hinge shaft 17 is inserted into a shaft hole 15 formed in the front of the main support body 10 and a shaft combining hole 21 formed in a side of the lever 20. The lever 20 is thereby rotatable relative to the main support body 10.

The latch 23 comprises a first tab 25 and a second tab 26 which protrude from the end of the lever 20 being supported by a predetermined distance to contact a front side and a back side of the opening 9. The latch 23 is formed extending along the lengthwise direction of the lever 20 from the end of the lever 20. The latch 23 may also be formed along the width of the lever 20.

The first tab 25 contacts a back side of the opening 9 when the lever 20 is rotated to combine with the main support body 10, thereby combining the main support body 10 and the casing 7.

The second tab 26 contacts the front side of the opening 9 when the lever 20 is rotated away from the main support body 10, thereby enabling the main support body 10 to be separated from the casing 7. The second tab 26 is provided in front of the first tab 25 having a predetermined distance therebetween, and the distance is large enough to accommodate a side of the opening 9 of the casing 7. A pair of second tabs 25 may be surroundingly contact the side of the opening 9.

The combiner 30 comprises a combining part 31 provided in the second side of the lever 20 and a lock 33 provided in a side of the main support body 10 to combine the combining part 31 to and/or releasing it from the main support body 10. The combiner 30 is provided in the main support body 10, and further comprises an elastic member 37 to elastically return the lock to an original position following operation.

In an aspect of the present invention, the combing part 31 is of a pin shape and is provided in the second side of the lever 20 along a direction transverse to the rotational direction of the lever 20.

According to an aspect of the present invention, the lock 33 is locked in the combining part 31 when the lever 20 rotates and contacts the main support part 10, and is released when the lock 33 is pressed by the control button 35. In one aspect of the present invention, the lock 33 is formed in the shape of a circular arc to lock the combining part 31.

The elastic member 37 is provided in the main support body 10 to elastically return the lock 33 and the control button 35 to their original positions after the control button 35 is operated. In an aspect of the present invention, the elastic member 37 comprises a planar spring provided at a rear of the lock 33 and the control button 35. The lock 33 and the control button 35 can be formed in a single body by injection molding.

The control button 35 is provided in a front side of the main support body 10 and causes the lock 33 to be pressed when the control button 35 is pressed, thus separating the lock 33 from the combining part 31 and releasing the combining part 31 from the lock 33.

Figure 4:
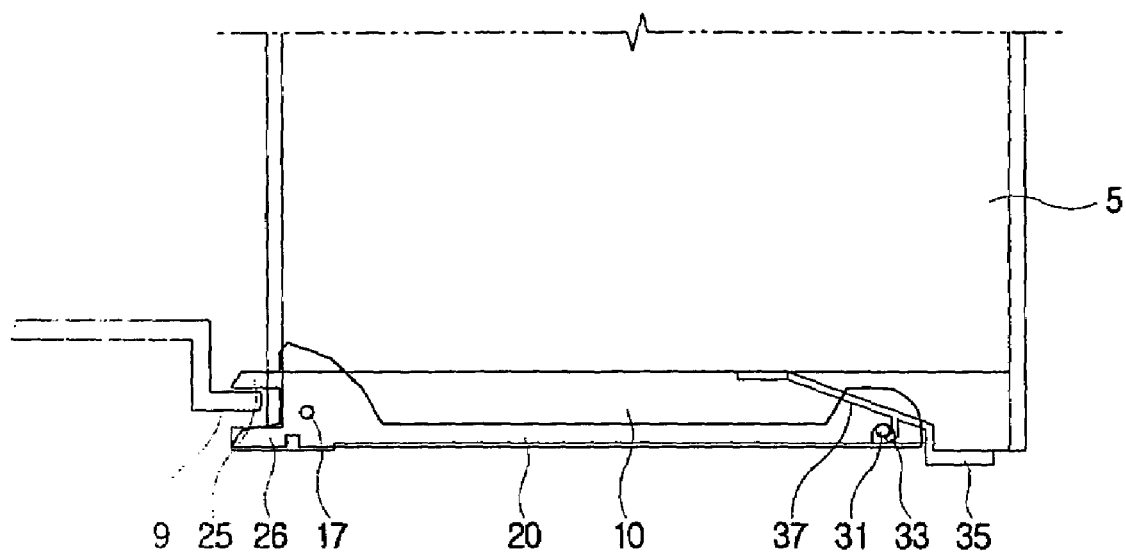
FIG. 4, FIG. 5, and FIG. 6 are schematic views showing operations of the hard disk support apparatus in FIG. 2.
Figure 5:
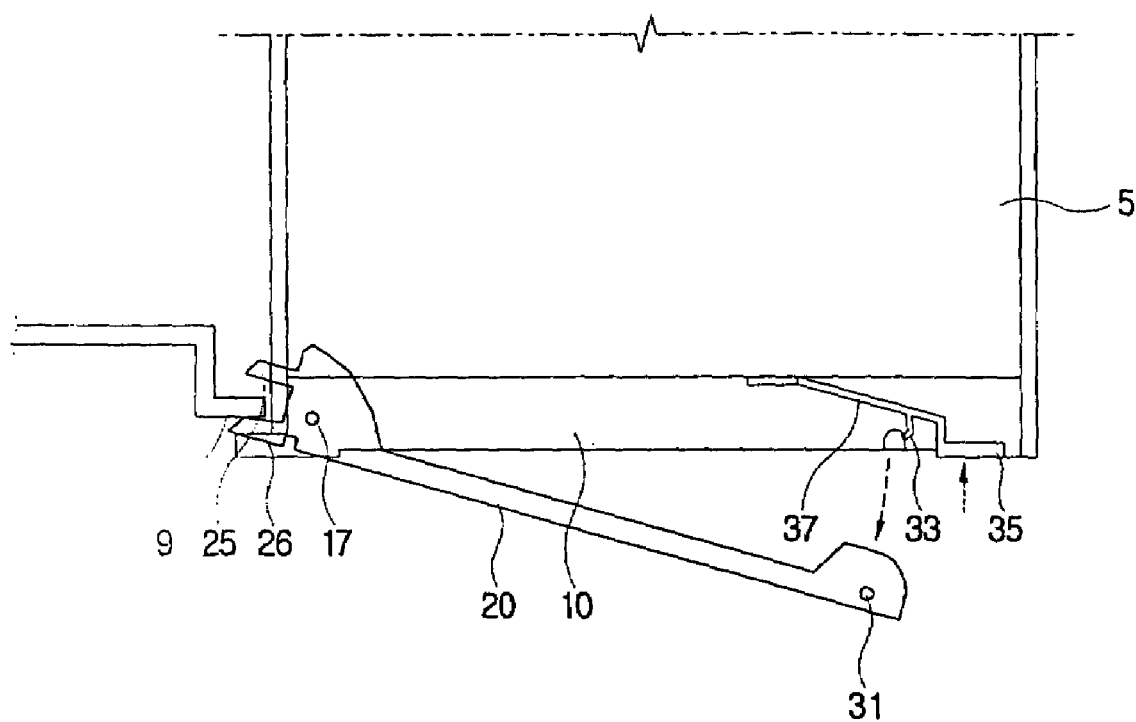
Figure 6:
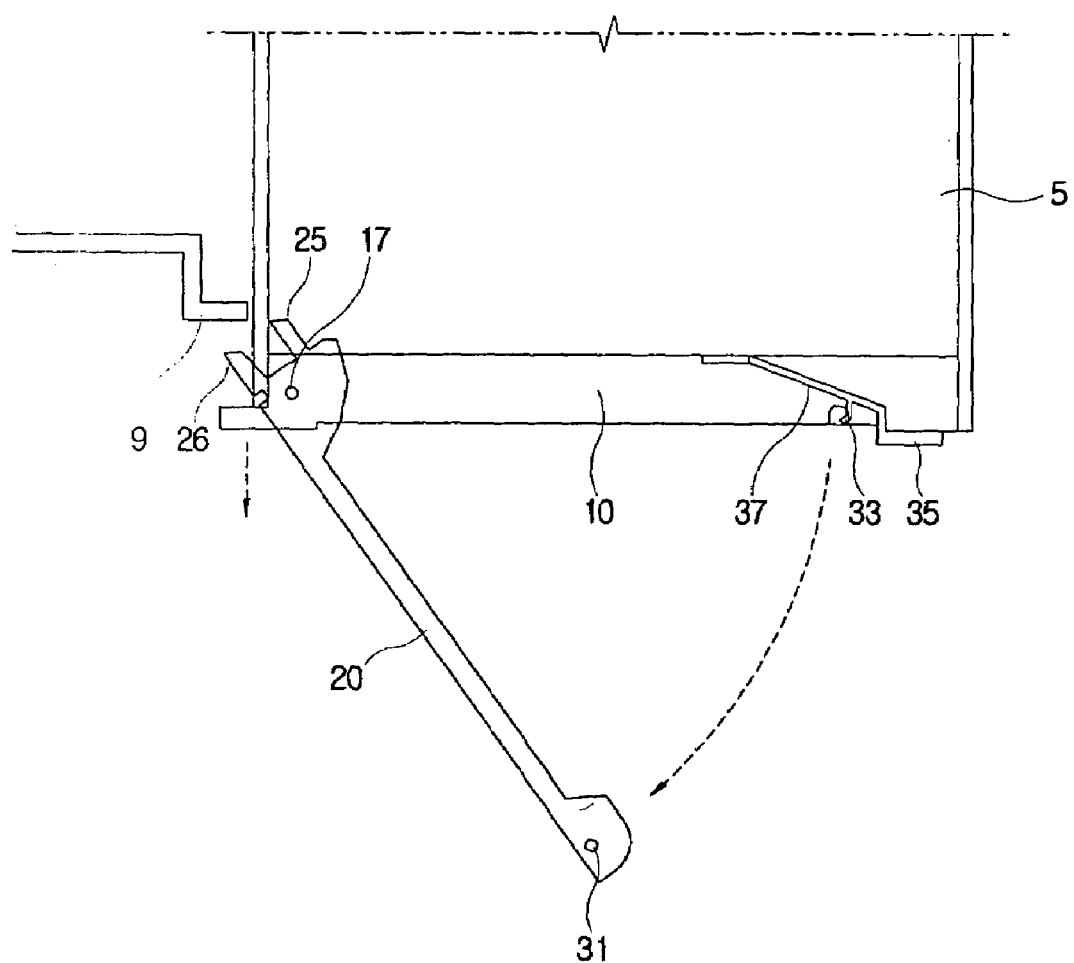

Using the above-described configuration, a combining process and a releasing process of a hard disk 5 with a casing 7 are illustrated in FIGS. 4 through 6.

The main support body 10 is combined to the hard disk 5 and inserted into the opening of the casing 7. The first tab 25 provided in the first side of the lever 20 is positioned to contact a back side of the opening 9. The lever 20 is rotated towards to the main support body 10. As the lever 20 rotates on the hinge shaft 17 while the first tab 25 is in contact the back side of the opening 9, the hard disk and the hard disk support apparatus are secured in the opening 9 by the leverage generated. At the same time, the combining part 31 of the lever 20 is inserted into the lock 33 and thereby combined with the main support body 10. The data port (not shown) and the power port (not shown) provided at the rear of the hard disk 5, are then combined with the data connecter (not shown) and the power connecter (not shown) provided in the casing 7. The hard disk 5 is thus easily combined with the casing 7.

The releasing process of the hard disk 5 from the casing 7 is as follows.

Initially, the control button 35 is operated, which in turn presses the lock 33, thereby separating the lock 33 from the combining part 31. The lever 20 is then free to rotate until the second side of the lever 20 is released from the main support body 10. Then, the lever 20 rotates centering on the hinge shaft 17 to force the second tab 26 to contact the front side of the opening 9. The generated leverage then easily separates the hard disk from the casing 7.

Figure 7:
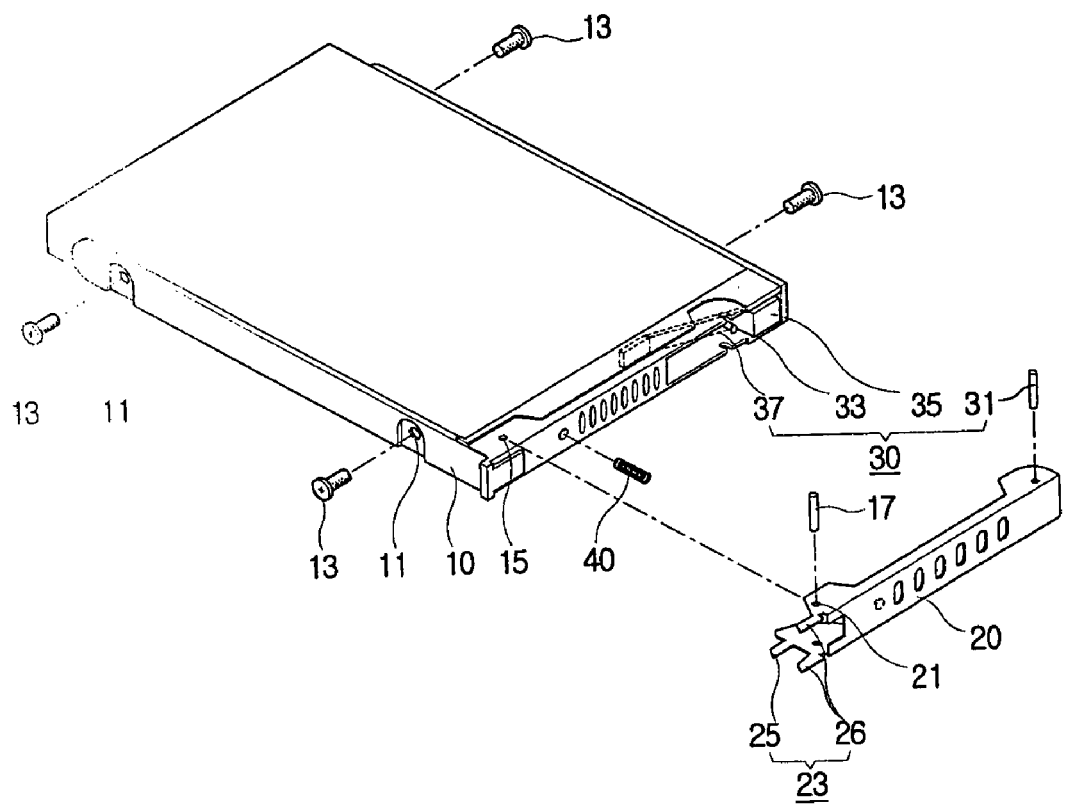
FIG. 7 is a partially exploded perspective view of the hard disk support apparatus according to another embodiment of the present invention.

As shown in FIG. 7, another embodiment of the present invention further comprises a spring 40.

The spring 40 is provided between the main support body 10 and the lever 20. The spring is positioned so as to rotate the second side of the lever 20 away from the main support body 10.

Herein, when the lock 33 and the combining part 31 are separated by operating the control button 35, the second side of the lever 20 rotates away from the main support body 10. Thus, the hard disk 5 can be more easily separated from the casing 7.

Figure 8:
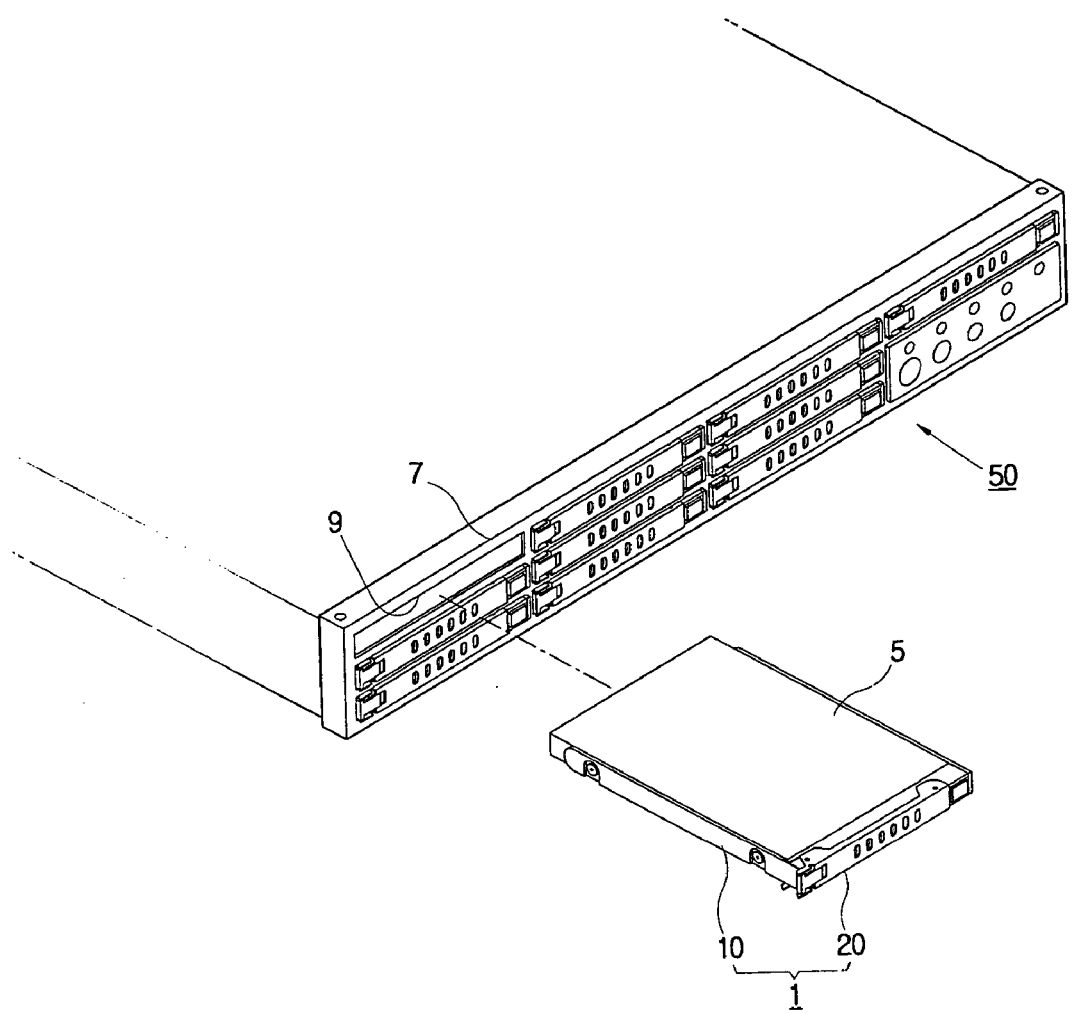
FIG. 8 is a partial perspective view of a server computer having a plurality of the hard disk support apparatuses, according to the present invention, installed therein.

As shown in FIG. 8, the server computer according to an aspect of the present invention comprises a computer main body 50, a hard disk apparatus 1 installed in the computer main body 50 according to the embodiments of the present invention, and the hard disk 5 mounted in the hard disk apparatus 1.

According to an aspect of the present invention, a plurality of openings 9 is formed in the casing 7 of the computer main body 50, and a plurality of main support bodies 10 and levers 20 are provided to be combined in each of the openings 9.

According to an aspect of the present invention, the main support body 10 and the hard disk 5 are of the 2.5 inch type.

According to an aspect of the present invention, the opening 9 is provided along the length of the casing 7 to slim the computer main body 50. As shown in FIG. 8, the server computer according to an aspect of the present invention can have multiple hard disks 5 mounted therein by arranging them along directions of the height and the length of the casing 7.

Herein, the present invention provides a server computer which can easily combine and/or separate a hard disk 5 from a computer main body 50, and slim-typed plural hard disks can be mounted thereon.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A hard disk support apparatus comprising:
   a casing having an opening to accommodate a hard disk;
   a main support body combinable with the hard disk and accommodated in the opening;
   a lever provided in a front of the main support body, having a first side rotatably combined to the main support body and a second side combinable with the main support body; and
   a control button to release the second side of the lever from the main support body;
   wherein the lever has a latch in an end side thereof to combine the main support body to and/or release the main support body from the opening by a rotation of the lever.

2. The hard disk support apparatus according to claim 1, wherein the control button is provided in one of the lever or the main support body.

3. The hard disk support apparatus according to claim 1, wherein the main support body is formed in the shape of a "U" to be combinable with a front side and lateral sides of the hard disk.

4. The hard disk support apparatus according to claim 1, wherein the latch is formed extending along a lengthwise direction from an end of the lever.

5. The hard disk support apparatus according to claim 1, wherein the opening is formed along a lengthwise direction of the casing.

6. The hard disk support apparatus according to claim 1, wherein the latch comprises a first tab and a second tab, both of which protrude from the first side of the lever, the first tab and the second tab having a predetermined distance therebetween so as to contact a back side and a front side of the opening, respectively.

7. The hard disk support apparatus according to claim 6, wherein:
   the first tab secures the main support body in the casing by contacting the back side of the opening when the lever is rotated towards the main support body; and
   the second tab separates the main support body from the casing by contacting the front side of the opening when the lever rotates in a release direction from the main support body.

8. The hard disk support apparatus according to claim 7, further comprising a hinge shaft to rotatably combine the first side of the lever with the main support body.

9. The hard disk support apparatus according to claim 8, further comprising a combiner to combine the second side of the lever with the main support body, the combiner comprising a combining part provided in the second side of the lever, and a lock provided in the main support body, the lock combinable with the combining part to securely combine the second side of the lever with the main support body.

10. The hard disk support apparatus according to claim 9, wherein the combining part provided in the second side of the lever is provided along a direction transverse to a direction of rotation of the lever.

11. The hard disk support apparatus according to claim 9, wherein the lock releases the second side of the lever from the combining part when the control button is operated.

12. The hard disk support apparatus according to claim 9, wherein the combiner further comprises an elastic member provided in the main support body, the elastic member enabling the lock and the control button to be elastically returned to an original position after the control button is operated.

13. The hard disk support apparatus according to claim 12, wherein the elastic member is a planar spring.

14. The hard disk support apparatus according to claim 12, further comprising a spring provided between the main support body and the lever, to rotate the second side of the lever away from the main support body by an elasticity of the spring when the lever is not combined with the main support body.

15. The hard disk support apparatus according to claim 12, wherein the lock, the control button, and the elastic member are formed in a single body by injection molding.

16. The hard disk support apparatus according to claim 14, wherein when the control button is operated, the control button contacts the lock to release the combining part, the lever is rotated away from the main support body by the spring, and the control button and the lock are returned to original positions by the elastic member.

17. A computer comprising:
a casing having an opening to accommodate a hard disk;
a main support body combinable with the hard disk and accommodated in the opening;
a lever provided in a front of the main support body, having a first side rotatably combined to the main support body and a second side combinable with the main support body; and
a control button to release the second side of the lever from the main support body,
wherein the lever has a latch in an end side thereof, to combine the main support body to and/or release the main support body from the opening by a rotation of the lever, and
the casing is a part of a computer main body.

18. The computer according to claim 17, wherein the casing includes a plurality of the openings, and the main support body and the lever are plurally provided, respectively, to be combined with each of the openings.

19. The computer according to claim 17, wherein the hard disk is of 2.5 inch type.

20. A computer comprising:
a hard disk;
a computer main body having a casing, the casing having an opening to accommodate the hard disk;
a main support body, combinable with the hard disk;
a lever rotatably combined with the front of the main support body; and
a control button to release a side of the lever from the main support body,
wherein, when the main support body is combined with the hard disk and inserted into the opening, the lever is rotated towards the main support body to combine the main support body and the casing, and when the lever is rotated away from the main support body the main support body is separated from the casing.

21. A hard disk support apparatus, combinable with a hard disk, to attach and/or detach the hard disk to a casing having an opening to accommodate the hard disk, the hard disk support apparatus comprising:
a main support body to combine the hard disk support apparatus with the hard disk;
a lever rotatably combined with the front of the main support body; and
a control button to release a side of the lever from the main support body,
wherein, when the main support body is combined with the hard disk and positioned in the opening, the lever is rotated towards the main support body to combine the main support body and the casing, and when the lever is rotated away from the main support body the main support body is separated from the casing.

22. The hard disk support apparatus of claim 21, wherein the lever further comprises:
a first side rotatably connected to the main support body;
a second side; and
a latch having a first tab and a second tab, both of which protrude from the first side of the lever, the first tab and the second tab having a predetermined distance therebetween so as to contact a back side and a front side of the opening, respectively.

23. The hard disk support apparatus according to claim 22, wherein:
the first tab secures the main support body to the casing by contacting a back side of the opening when the lever is rotated towards the main support body; and
the second tab separates the main support body from the casing by contacting a front side of the opening when the lever rotates in a release direction from the main support body.

24. The hard disk support apparatus according to claim 23, further comprising a combiner to combine the second side of the lever with the main support body, the combiner comprising a combining part provided in the second side of the lever, and a lock to combine with the combining part provided in the main support body.

25. A hard disk support apparatus, combinable with a hard disk, to attach and/or detach the hard disk to a casing having an opening to accommodate the hard disk, the hard disk support apparatus comprising:
a main support body to combine the hard disk support apparatus with the hard disk;
a lever rotatably combined with the front of the main support body, the lever comprising:
a first side rotatably connected to the main support body;
a second side; and
a latch having a first tab and a second tab, both of which protrude from the first side of the lever, the first tab and the second tab having a predetermined distance therebetween so as to contact a back side and a front side of the opening, respectively;
the first tab secures the main support body to the casing by contacting a back side of the opening when the lever is rotated towards the main support body; and
the second tab separates the main support body from the casing by contacting a front side of the opening when the lever rotates in a release direction from the main support body,
wherein, when the main support body is combined with the hard disk and positioned in the opening, the lever is rotated towards the main support body to combine the main support body and the casing, and when the lever is rotated away from the main support body the main support body is separated from the casing.

26. The hard disk support apparatus according to claim 25, further comprising a combiner to combine the second side of the lever with the main support body, the combiner comprising a combining cart provided in the second side of the lever, and a lock to combine with the combining part provided in the main support body.

* * * * *

UNITED STATES PATENT AND TRADEMARK OFFICE
CERTIFICATE OF CORRECTION

PATENT NO. : 7,110,250 B2 Page 1 of 1
APPLICATION NO. : 10/883974
DATED : September 19, 2006
INVENTOR(S) : Chung-youl Lee It is certified that error appears in the above-identified patent and that said Letters Patent is hereby corrected as shown below:

Column 8, Line 54, change "cart" to --part--.

Signed and Sealed this

Thirteenth Day of February, 2007

JON W. DUDAS
*Director of the United States Patent and Trademark Office*